No. 635,677. Patented Oct. 24, 1899.
M. E. DUNBAR.
BICYCLE BRAKE.
(Application filed Nov. 5, 1898.)

(No Model.)

Witnesses.

R. H. Newman.

Edward K. Nicholson

Inventor.

Miles E. Dunbar

By

Chamberlain & Newman

Attorneys

THE NORRIS PETERS CO., PHOTO-LITHO., WASHINGTON, D. C.

UNITED STATES PATENT OFFICE.

MILES EMERSON DUNBAR, OF STOCKBRIDGE, MASSACHUSETTS.

BICYCLE-BRAKE.

SPECIFICATION forming part of Letters Patent No. 635,677, dated October 24, 1899.

Application filed November 5, 1898. Serial No. 695,629. (No model.)

*To all whom it may concern:*

Be it known that I, MILES EMERSON DUNBAR, a citizen of the United States, and a resident of Stockbridge, in the county of Berkshire and State of Massachusetts, have invented certain new and useful Improvements in Bicycle-Brakes, of which the following is a specification.

This invention relates to new and useful improvements in bicycle-brakes, and particularly that class employing rolls to engage the tire.

It is the object of my invention to improve upon brakes of the above class by providing a special arrangement of rolls whereby the sides of the tire are engaged in an improved manner, and, further, to provide practical means of attachment whereby said brake may readily be attached to most any form of wheel, new or old, and to utilize the popular form of connections for operating said brake.

With the above objects in view my invention resides and consists in the novel construction and combination of parts shown in the accompanying drawings, forming a part of this specification, and upon which similar letters of reference denote like or corresponding parts throughout the several figures, and of which—

Figure 1:
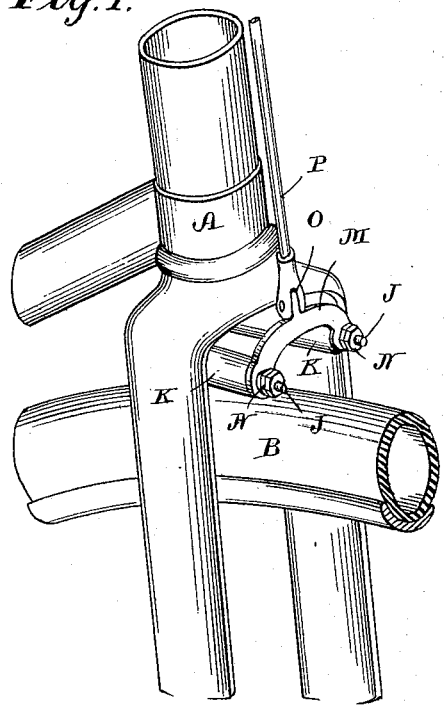
Figure 2:
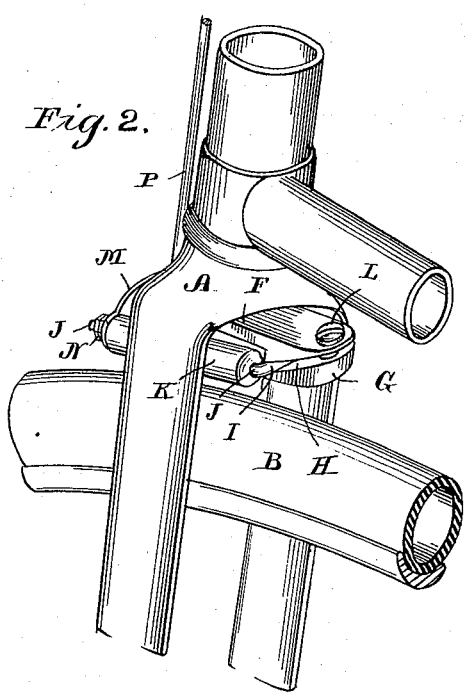
Figure 3:
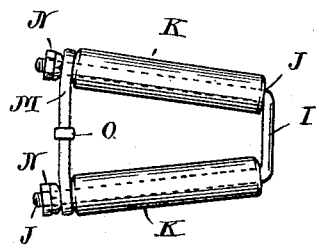
Figure 4:
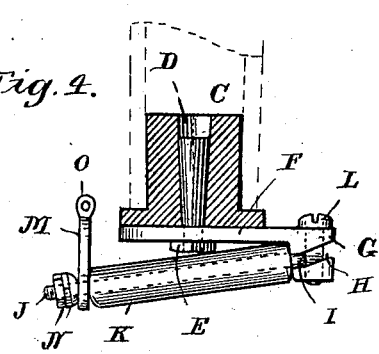

Figure 1 shows a detail front perspective view of a portion of a bicycle head, fork, and tire with my improved brake applied thereto. Fig. 2 is a similar rear perspective of the parts shown in Fig. 1. Fig. 3 is a detached plan view of the engaging rolls detached, and Fig. 4 is a detached side elevation of the several parts of my improved brake.

Referring to the characters of reference marked upon the drawings, A indicates a part of a bicycle-head, and B a section of a tire within the fork of said head. These parts may be of the ordinary or any preferred construction and form no part of the invention.

The means shown in the drawings for attaching my brake to a wheel is particularly designed for wheels having a hollow head and wherein a round opening is formed in the under side or crotch of the fork of said head. Said means, as shown, (see Fig. 4,) comprises a split collet C, which is loosely inserted into said hole and secured there by means of a wedge-shaped pin D, fitted into a central recess of said collet and bearing a reduced threaded end, upon which is attached a nut E, the latter serving as a means by which said pin is drawn down against the inclined walls of the collet in a manner to spread the same. It will thus be apparent that the collet can readily be attached without injuring or defacing a wheel, and thus serves as a particularly desirable form of engagement. Secured to the collet in any suitable manner is a plate F, bearing a rearward extension G, which latter is provided with a declined slot H to receive the pivotal connection I of the shafts J upon which the rolls K are mounted. In instances where the bicycle-heads do not contain a hole, as above referred to, other forms of attachment can be used—such, for instance, as providing clips with suitable connections upon the two members of the fork.

The shafts J are preferably connected at their rear ends and contracted ends by a pivotal part I, as shown. This part is of a proper size to loosely slip into the declined slot H before referred to, and as a means for retaining said part operatively in place I employ a screw L, which passes down through the slot and engages the lower portion of the plate and the back of connection I. Both of the roll-shafts, as will be apparent, are formed in one continuous piece, being connected across the back, as at I, thus insuring said shafts being raised and lowered together for the purpose of engaging and disengaging the tire. The rolls are free to turn upon said shafts and are raised and lowered by means of a yoke connection M engaging the forward ends of the shafts and adjustably secured in place by means of nuts N. The yoke M is provided with an eye O for the purpose of attaching the ordinary brake-rod which is employed to connect with the operating-lever of a handle-bar. It will thus be apparent that in order to attach my improved brake to a bicycle of the class described it is simply necessary to attach the collet in the manner previously described and connect the brake-rod with the eye O of the yoke, whereupon it is ready for operation.

The relative position of the two shafts J are preferably not parallel, but are arranged horizontally and at an acute angle to each other. This angle may vary, but in practice is substantially that shown in Fig. 3. The rolls when applied will simultaneously engage the two sides of the tire at an acute angle in a manner to afford resistance thereto in accordance with the pressure applied. It will be noted that with this form of construction the resistance of the rolls is much greater than that where the rolls are arranged directly crosswise of the tire, since the contact is a bias one, and consequently said rolls do not rotate as freely, but yet turn sufficiently to prevent them from becoming worn and flattened. The tire turns against the contracted sides of the rolls and in a manner to turn the rolls outward.

Having thus described my invention, what I claim, and desire to secure by Letters Patent, is—

1. In a bicycle-brake, the combination with attaching mechanism, of a pair of diverging roll-shafts arranged substantially horizontally between the forks of the wheel, pivotal connections at one end for said shafts, rolls upon said shafts and means for manipulating the free ends of said shafts whereby the forward ends of said rolls are operated to engage and disengage the wheel.

2. A bicycle-brake of the class described, the same comprising a plate with means of attachment to a fork, of a pair of integral diverging roll-shafts pivoted horizontally to said attaching-plate, rolls journaled on said shafts, connections with the free ends of the roll-shafts whereby their forward free ends are raised and lowered to engage the wheel.

3. In a bicycle-brake, the combination with attaching mechanism, of a pair of shafts each arranged at an obtuse angle to their bearing and between the forks, means for pivoting said shafts to the attaching mechanism, rolls operatively mounted on said shafts, connections with the free ends of the roll-shafts, whereby they are swung on their pivot to operate the rolls.

4. In a bicycle-brake the combination with a plate, of a pair of horizontally-arranged diverging shafts pivoted in said plate, rolls loosely mounted on said shafts, a yoke and operative connections for raising and lowering the free ends of said shafts and rolls, substantially as described.

5. The combination in a bicycle-brake, of an attachable plate having a bearing therein, a pair of roll-shafts journaled in said bearing and each arranged at an obtuse angle to their bearing, a screw to retain said shafts in its bearing, rolls mounted on said shafts and means to operate said rolls and shafts to engage and disengage the tire.

Signed at Stockbridge, in the county of Berkshire and State of Massachusetts, this 19th day of October, A. D. 1898.

MILES EMERSON DUNBAR.

Witnesses:
 FRED CLIFT ELLICOTT,
 PEARL CLEMENTINA HUNTER.